United States Patent [19]
Dribnenki

[11] 3,745,987
[45] July 17, 1973

[54] SELF-CONTAINED GASOLINE FRY PAN
[76] Inventor: Joe J. Dribnenki, General Delivery, Casa Grande, Ariz. 85222
[22] Filed: May 12, 1971
[21] Appl. No.: 142,504

[52] U.S. Cl. .................................................. 126/38
[51] Int. Cl. ............................................. F24c 5/20
[58] Field of Search...................... 126/38, 44, 265, 126/266

[56] References Cited
UNITED STATES PATENTS
| | | | |
|---|---|---|---|
| 810,229 | 1/1906 | Stange | 126/266 |
| 2,976,390 | 3/1961 | Stemp | 126/266 X |
| 3,080,861 | 3/1963 | Amero | 126/44 X |
| 3,509,870 | 5/1970 | Sheppard | 126/38 X |

FOREIGN PATENTS OR APPLICATIONS
523,715  7/1940  Great Britain ...................... 126/38

Primary Examiner—Edward G. Favors
Attorney—Cahill, Sutton, Thomas & Phillips

[57] ABSTRACT

A portable frying pan. A base member with a gasoline fired burner, the base being clipped to the frying pan body which is removable.

3 Claims, 2 Drawing Figures

PATENTED JUL 17 1973 3,745,987

INVENTOR.
JOE J. DRIBNENKI

SELF-CONTAINED GASOLINE FRY PAN

This invention relates to utensils, and more particularly to a self-contained gasoline frying pan.

It is therefore the primary purpose of this invention to provide a frying pan which will be portable for use outdoors and anywhere desired.

Another object of this invention is to provide a fry pan which will have a base member with a gasoline tank on its interior, the base being ventilated so as to be able to egress air to support combustion at the rear portion within the base.

Still another object of this invention is to provide a fry pan of the type described which will have means for the burner and an air pump for putting air under pressure onto the gasoline so as to feed it to the burner.

Yet another object of this invention is to provide a fry pan of the type described which will have a pivotable handle member secured to the pan body so as to enable the user to carry the device comfortably.

A further object of this invention is to provide a fry pan of the type described which will have clip members for securing the pan body to the base member, the clips being pivotable so as to enable the pan body to be removed from the base when desired.

Other objects of the present invention are to provide a self-contained gasoline fry pan which is simple in design, inexpensive to manufacture, rugged in construction, easy to use and efficient in operation.

Figure 1:
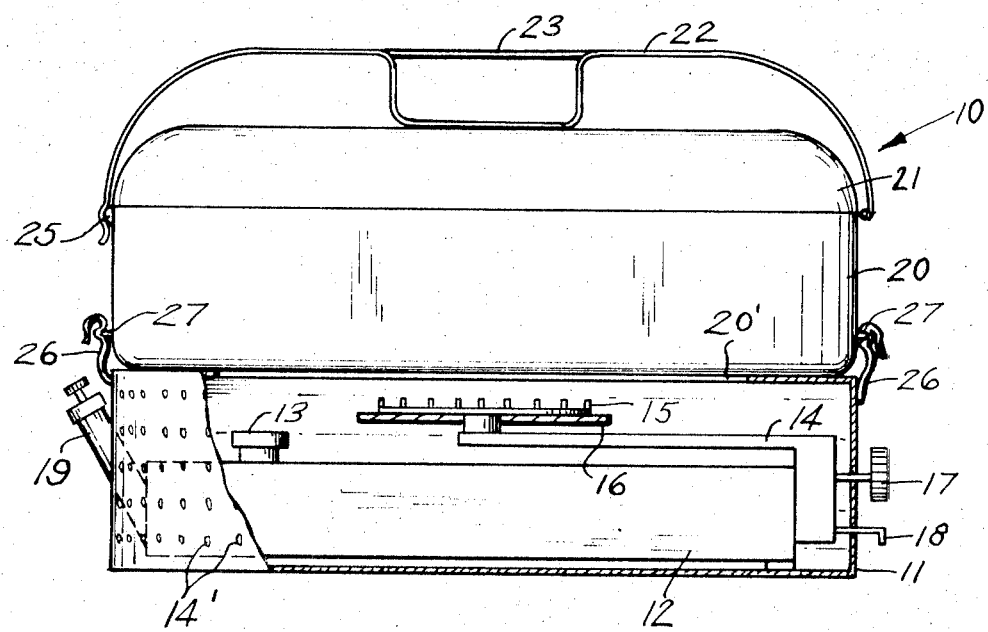
Figure 2:
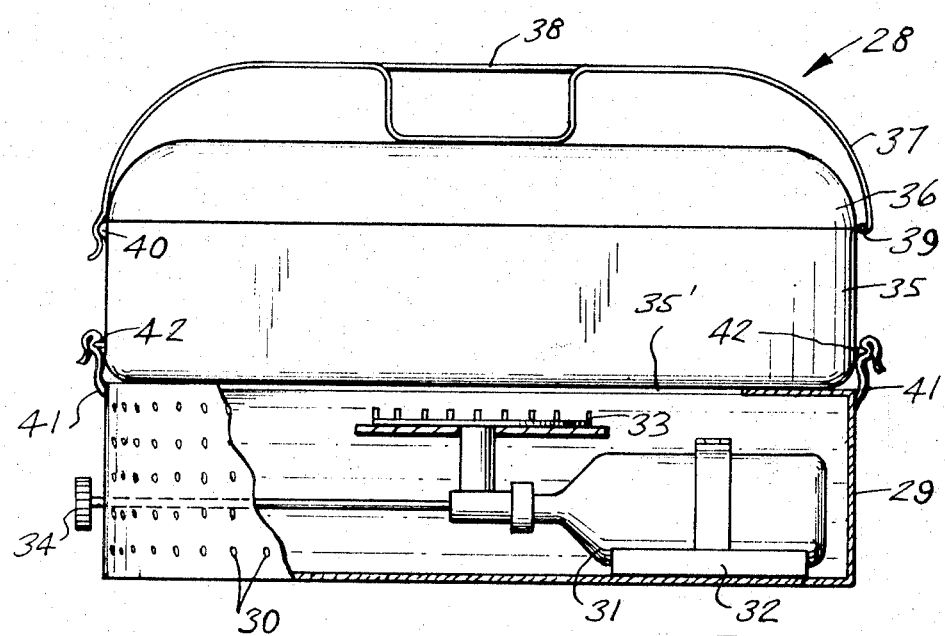

These and other objects will become readily evident upon a study of the following specification together with the accompanying drawing wherein:

FIG. 1 is a side view of the present invention shown in elevation and partly broken away; and FIG. 2 is similar to FIG. 1, but showing a modified form of the invention utilizing a disposable bottle.

According to this invention, a self-contained gasoline fry pan 10 is shown to include a base member 11 having on its interior a gasoline tank 12 with a filler cap 13. A tube 14 extends from the tank 12 to the central portion of the outer extremity of base 11 and is secured fixedly thereto a burner 15 which has an insulating disc 16 of asbestos or other suitable material secured beneath it for protection of the tank 12.

Base 11 is provided with a plurality of spaced apart vent openings 14' allowing for the ingression of air into base 11 so as to support combustion at the burner 15. Extending outwards from base 11 are control knobs 17 and 18 and on the opposite side of base 11 extends an air pump 19. The pan body 20 is secured over the opening 20' of the upper extremity of base 11 so that the heat from burner 15 may be directly applied to the pan body 20. The pan body 20 also includes a lid cover 21. A handle 22 includes a cross-bar member 23 for easily lifting and carrying pan 10 and handle 22 is secured to a hinge 24 extending from main body 20 of the fry pan. The opposite end of handle 22 snapably engages a projection 25 diametrically opposed to hinge 24. A pair of pivotable fasteners 26 provide a means for snapably engaging extension 27 so as to render pan body 20 secure to base 11 and enables the user to remove the pan body 20 from base 11 when desired.

In use, a control 17 and 18 are set for the proper heat desired from burner 15, after the air pump 19 has been activated. Food is cooked in pan body 20 in the well known manner and when it is desired to clean the pan body 20, it is snapably disengaged from the fasteners 26.

Looking now at FIG. 2 of the drawing, one will see a modified form of fry pan 28 having a base 29 with a plurality of spaced apart vent openings 30 for enabling air and atmospheric pressure to enter to support combustion at the burner 33. A disposable gas bottle 31 is secured within a bracket 32 within base 29 and a flow of gas from bottle 31 is controlled by means of control knob 34. The pan body 35 rests over the opening 35' of base 29 and the pan body 35 includes a cover 36. A handle 37 includes a cross-bar 38 similar to thank of the main embodiment of the present invention heretofore described and the handle 37 is secured to hing 39. The opposite end of handle 37 is snapably engaged over projection 40 of pan body 35 in order to render handle 37 stationary for portability of device 28.

A pair of fasteners 41 extend upwards from base 29 and snapably engage projections 42, the arrangement being similar to that described of main embodiment of the present invention.

What I claim is:

1. A self-contained gasoline fry pan, comprising a base member having a flat bottom, perforated sides extending upwardly from said bottom, and a flat top extending inwardly from said sides, said top having an opening therein, said opening being smaller in area than said top to provide a flat support ledge, a gasoline tank carried within said base member providing fuel means for a burner contained within said base, control knob means carried within said base and an air pump for controlling the flow of gasoline to said burner, a fry pan body carried on said base with pivotable fasteners so as to enable the user to remove said pan body for cleaning, said fry pan having a flat bottom in surface-to-surface contact with said flat support ledge, a lid carried by said pan and a handle for carrying said device, said burner positioned beneath said opening to permit flame from said burner to be applied directly to the flat bottom of said fry pan, and an insulator secured to the bottom of said burner to protect said gasoline tank from said flame.

2. The combination according to claim 1, wherein said device includes a handle which extends across the top of the lid of said body, said lid being removable therefrom and said handle is secured to hinge means at one peripheral side of said body and the opposite end of said handle is snapably engaged over a projection extending from the upper extremity of said pan body thus rendering said handle stationary in order to lift and carry said device to a location.

3. The combination according to claim 2, wherein said handle stands upwards and is spaced above the top surface of said lid and is provided with a U-shaped central portion having a cross-bar secured thereto, said cross-bar providing means for gripping said handle in order to lift said device.

* * * * *